US012700884B2

(12) United States Patent
Ma et al.

(10) Patent No.: US 12,700,884 B2
(45) Date of Patent: Aug. 4, 2026

(54) NOISE CANCELING CIRCUITS

(71) Applicant: Hewlett-Packard Development Company, L.P., Spring, TX (US)

(72) Inventors: Chin-Hung Ma, Taipei City (TW);
Chang-Cheng Hsieh, Taipei City (TW);
Yung-Chang Wei, Taipei City (TW);
Isaac Lagnado, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/873,676

(22) PCT Filed: Jul. 14, 2022

(86) PCT No.: PCT/US2022/037189
§ 371 (c)(1),
(2) Date: Dec. 10, 2024

(87) PCT Pub. No.: WO2024/015064
PCT Pub. Date: Jan. 18, 2024

(65) Prior Publication Data
US 2025/0373273 A1     Dec. 4, 2025

(51) Int. Cl.
*H04B 1/10*      (2006.01)
*H04B 15/02*     (2006.01)

(52) U.S. Cl.
CPC ............... *H04B 1/10* (2013.01); *H04B 15/02* (2013.01)

(58) Field of Classification Search
CPC ................................. H04B 1/10; H04B 15/02
USPC ......................................................... 375/346
See application file for complete search history.

(56) References Cited

U.S. PATENT DOCUMENTS 6,091,165 A * 7/2000 Askew ............. H03K 19/00346
                                                   307/409
2010/0123640 A1   5/2010   Hui et al.
2011/0294537 A1   12/2011   Vance
2012/0178503 A1   7/2012   Merz et al.
2019/0081410 A1   3/2019   Zhou et al.

FOREIGN PATENT DOCUMENTS

EP           2391026 A2    11/2011
GB           2438751 A * 12/2007  ............... H04B 1/44

* cited by examiner

*Primary Examiner* — Dominic D Saltarelli
(74) *Attorney, Agent, or Firm* — Quarles & Brady LLP

(57) ABSTRACT

In some examples, an antenna module includes a ground plane, where the ground plane couples to a ground foil of an electronic device, an antenna coupled to the ground plane, and a noise canceling circuit disposed within a cutout of the ground plane.

20 Claims, 6 Drawing Sheets

400

NOISE CANCELING CIRCUITS

BACKGROUND

Electronic devices such as desktops, laptops, notebooks, tablets, and smartphones and display devices such as monitors of electronic devices and televisions include antennas to enable wireless communications. Different standards or regulations govern the wireless communications. The standards or regulations govern operations within different frequency bands, for instance. The frequency bands include a 2.4 gigahertz (GHz) frequency band, a 5 GHz frequency band, a 6 GHz frequency band, or a combination thereof, for instance.

BRIEF DESCRIPTION OF THE DRAWINGS

Various examples are described below referring to the following figures.

DETAILED DESCRIPTION

Figure 1:
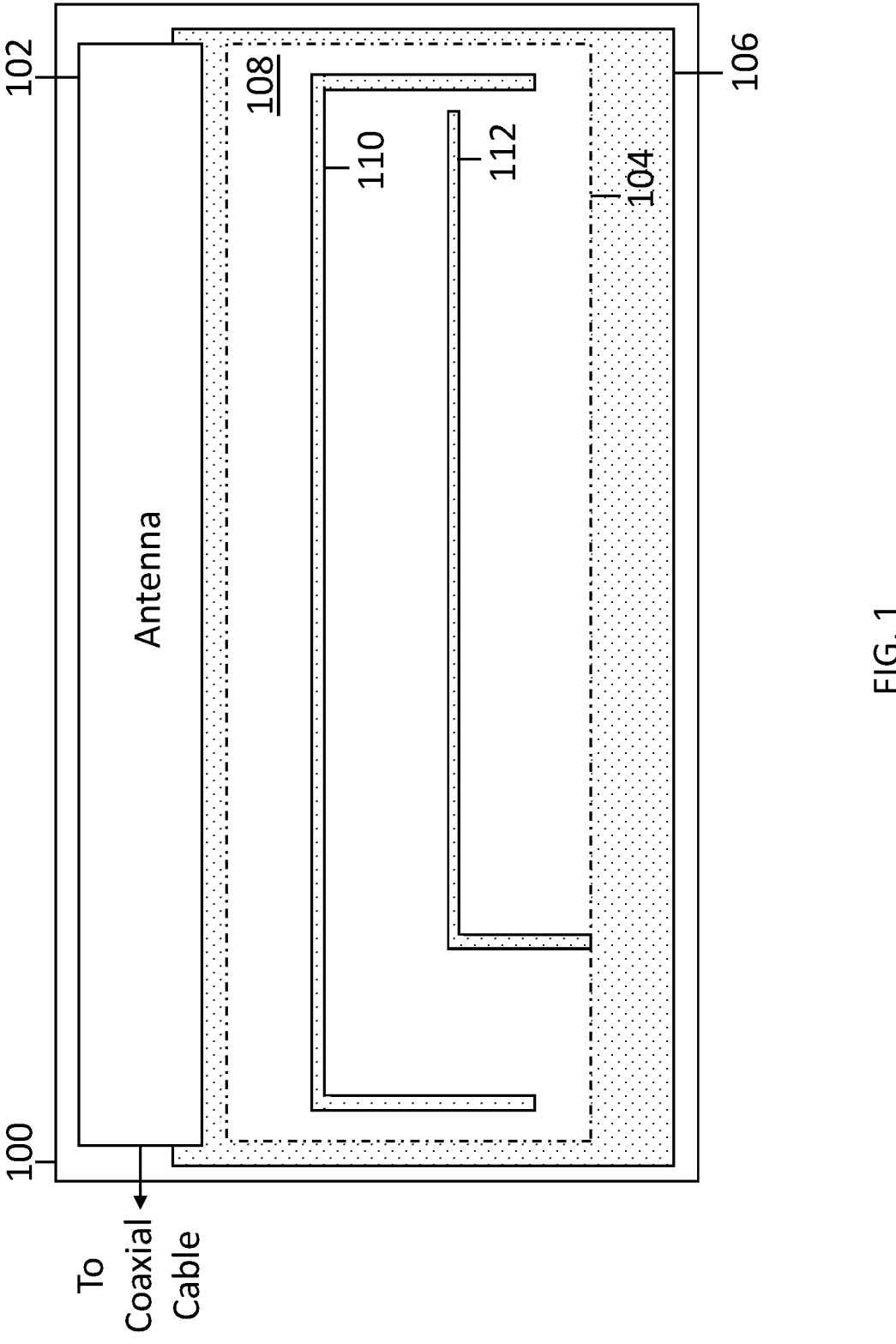
FIG. 1 is a block diagram of an antenna module having a noise canceling circuit, in accordance with various examples.

As described above, electronic devices include antennas to enable wireless communications. Different standards or regulations govern the wireless communications within different frequency bands. The frequency bands include a 2.4 gigahertz (GHz) frequency band, a 5 GHz frequency band, a 6 GHz frequency band, or a combination thereof, for instance. Antennas of an electronic device are located within the electronic device to facilitate the emission of radiation at the different frequency bands. The antennas are often located within a chassis of an electronic device, for instance. Other components of the electronic device are located within the chassis as well. The other components generate electromagnetic interference or noise that interferes with operations of the antennas in some instances. Some electronic devices include bulky noise suppression components around a noise source. The noise suppression components include a gasket, an absorber material, shielding, or other suitable components that isolate a noisy component. However, the noise suppression components reduce availability of space for other components, increase dimensions of the electronic device, increase a weight of the electronic device, or a combination thereof. Some electronic devices remove the noise suppression components. Removing the noise suppression components increases interference with operations of the antennas.

This disclosure describes example antenna modules having noise canceling circuits. In some examples, the antenna module includes multiple antennas that resonate in response to different frequency ranges. A frequency range, as used herein, is a subset of frequencies that are included in a frequency band. The noise canceling circuit is disposed within a cutout of a ground foil that couples a ground of the antenna to a ground of a system. The system is a display device, an electronic device, or a combination thereof. The noise canceling circuit is disposed on a non-conducting substrate within the cutout, for example. The ground is a metal portion of a chassis of the electronic device, for example. In some examples, the noise canceling circuit includes a first resonating element and a second resonating element. The first resonating element has a length that is a half wavelength or a quarter wavelength of a frequency range of the antenna. The second resonating element has a length that is a quarter wavelength of the frequency range of the antenna. In some examples, the first resonating element is based on a first frequency range of the antenna, and the second resonating element is based on a second frequency range of the antenna. In other examples, the noise canceling circuit includes a resistor (R), inductor (L), capacitor (C) circuit (RLC circuit). The RLC circuit provides matching, filtering, or a combination thereof. In various examples, the noise canceling circuit includes a resonating element, an LC circuit, switches, a tuner, or a combination thereof. The LC circuit provides matching, filtering, or a combination thereof. The resonating element has a length that is a half wavelength or a quarter wavelength. In some examples, the tuner couples to a controller of the electronic device. In response to detection of different frequencies, the controller causes the tuner to enable or disable the switches to filter out noises in response to a detected frequency.

By locating the noise canceling circuit within the ground foil, the noise canceling circuit does not increase a footprint of the antenna module. By utilizing the antenna having the noise canceling circuit, use of bulky noise suppression components is reduced. Reduction of use of the noise suppression components increases availability of space for other components, reduces dimensions of the electronic device, reduces a weight of the electronic device, or a combination thereof. By utilizing the antenna module having the noise canceling circuit, interference with operations of the antennas is reduced.

In some examples, in accordance with the present description, an antenna module is provided. The antenna module includes a ground plane, where the ground plane couples to a ground foil of an electronic device, an antenna coupled to the ground plane, and a noise canceling circuit disposed within a cutout of the ground plane.

In some examples in accordance with the present description, a display device is provided. The display device includes a chassis having a plastic portion and a metal portion, a ground foil, an antenna, and a noise canceling circuit. The chassis includes a metal portion and includes an internal side and an external side. The ground foil is coupled to the metal portion of the internal side of the chassis. The antenna is coupled to the ground foil. The antenna is disposed on the plastic portion of the internal side of the chassis. The noise canceling circuit is coupled to the antenna. The noise canceling circuit is disposed within a cutout of the ground foil.

In some examples, in accordance with the present description, an electronic device is provided. The electronic device includes a ground foil coupled to an internal, metal portion of a chassis of the electronic device, an antenna having a ground coupled to the ground foil, and a noise canceling circuit. The antenna is disposed on an internal, plastic portion of the chassis. The noise canceling circuit includes a resonating element, a filter having a first terminal and a second terminal, the first terminal coupled to the resonating element, and a tuner coupled to a first end of a switch and to the ground foil. The tuner detects a frequency of the resonating element, and, in response to the frequency, causes the second terminal to couple to a second end of the switch.

Referring now to FIG. 1, a block diagram of an antenna module 100 having a noise canceling circuit 104 is shown, in accordance with various examples. The antenna module 100 includes an antenna 102, the noise canceling circuit 104, and a ground plane 106. The antenna 102 is any suitable antenna for enabling wireless communications within a frequency band. The antenna 102 enables wireless communications within the 2.4 gigahertz (GHz) frequency band, the 5 GHz frequency band, the 6 GHz frequency band, Global Positioning System (GPS) frequency bands, a BLUETOOTH frequency band, Wide Wireless Area Network (WWAN) frequency bands, or other suitable frequency band for wireless communications, for example. The noise canceling circuit 104 includes a substrate 108 and resonating elements 110, 112, for example. The resonating elements 110, 112 resonate in different frequency ranges. The resonating element 110 resonates in response to a signal having a frequency within a first frequency range, for example. The resonating element 112 resonates in response to a signal having a frequency within a second frequency range, for example.

The antenna 102 and the resonating element 112 couple to the ground plane 106. The antenna 102, the resonating element 112, or the combination thereof, couples to the ground plane 106 via a solder joint. In other examples not shown, the antenna 102, the resonating element 110, the resonating element 112, or a combination thereof, couple to the ground plane 106 using a via. A via, as used herein, is a hole that includes a metal tube or post that couples a first layer to a second layer. The first layer is a resonating layer and the second layer is the ground plane 106, for example.

In various examples, the substrate 108 is disposed within a cutout of the ground plane 106. The substrate 108 may be any suitable substrate useful in the forming of electrical components or circuit arrangements of electrical components and connections among the electrical components and may be non-conductive to prevent interference with operation of those electrical components. In some examples, the ground plane 106 is to couple to a ground foil of a system. The system is an electronic device, a display device, or a combination thereof, for example. In various examples, the cutout of the ground plane 106 corresponds to a cutout of the ground foil of the system. In some examples, the ground plane 106 is to couple to the ground foil of the system. For example, the antenna module 100 includes metal pads or traces such that in response to the antenna module 100 being disposed within the system, the metal pads or traces are to couple the ground plane 106 to the ground foil of the system.

In some examples, the antenna module 100 includes a connector for a coaxial cable. The connector enables the ground plane 106 to couple to a ground reference of the system. The ground reference of the system is a metal portion of a chassis of the system, a ground of a printed circuit board (PCB) of the system (e.g., a motherboard), or a combination thereof, for example. The coaxial cable enables the antenna module 100 to communicate with a controller of the system. The controller is a controller of a wireless transceiver module or a processor of the system, for example.

As described above, in some examples, the antenna module 100 includes multiple antennas that resonate in response to different frequency ranges. For example, a first antenna of the multiple antennas resonates in response to a signal having frequencies within a 2.4 GHz frequency band, and a second antenna of the multiple antennas resonates in response to signals having frequencies within a 5 GHz frequency band. The noise canceling circuit 104 includes a first resonating element (e.g., the resonating element 110) having a length that is a half wavelength or a quarter wavelength of a frequency range of the first antenna, and a second resonating element (e.g., the resonating element 112) having a length that is a quarter wavelength of the frequency range of the second antenna. The first resonating element resonates in response to a signal having a frequency within a first frequency range associated with the first antenna. The second resonating element couples to the ground plane 106 and resonates in response to a signal having a frequency within a second frequency range associated with the second antenna.

In another example, the antenna module 100 includes the antenna 102 having multiple resonators, where a resonator of the multiple resonators resonates in response to a signal having frequencies within a different frequency range from other resonators of the multiple resonators. The antenna 102 may be a GPS antenna or a WWAN antenna, for example. The noise canceling circuit 104 includes a first resonating element (e.g., the resonating element 110) having a length that is a half wavelength or a quarter wavelength of a first frequency range of a first frequency band of the antenna 102 and a second resonating element (e.g., the resonating element 112) having a length that is a quarter wavelength of the frequency range of a second frequency band of the antenna 102. The first resonating element resonates in response to a signal having a frequency within the first frequency range, and the second resonating element resonates in response to a signal having a frequency within the second frequency range.

By including the resonating elements 110, 112, the noise canceling circuit 104 enables noise suppression functionality via canceling noise conductively through an antenna coaxial cable or radiation noise from the system to the antenna 102 or antenna module 100.

Figure 2:
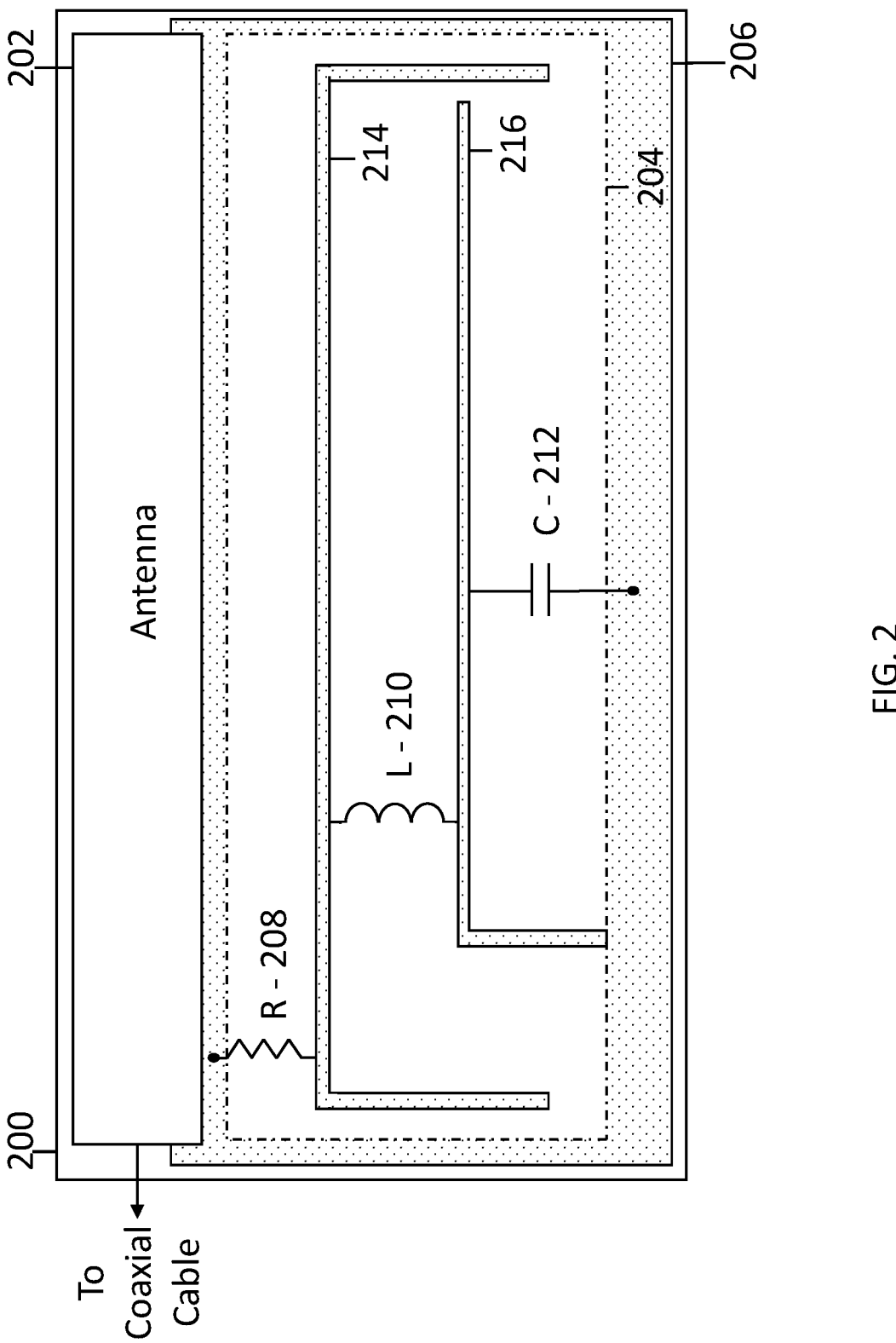
FIG. 2 is a block diagram of an antenna module having a noise canceling circuit, in accordance with various examples.

Referring now to FIG. 2, a block diagram of an antenna module 200 having a noise canceling circuit 204 is shown, in accordance with various examples. The antenna module 200 includes an antenna 202, the noise canceling circuit 204, and a ground plane 206. The antenna 202 is any suitable antenna for enabling wireless communications within a frequency band. The antenna 202 enables wireless communications within the 2.4 gigahertz (GHz) frequency band, the 5 GHz frequency band, the 6 GHz frequency band, Global Positioning System (GPS) frequency bands, a BLUETOOTH frequency band, Wide Wireless Area Network (WWAN) frequency bands, or other suitable frequency band for wireless communications, for example. The noise canceling circuit 204 includes a resistive element 208, an inductive element 210, a capacitive element 212, and resonating elements 214, 216, for example. As described above with respect to the resonating elements 110, 112 of FIG. 1, the resonating elements 214, 216 resonate in different frequency ranges.

The antenna 202, the resistive element 208, the capacitive element 212, and the resonating element 216 couple to the ground plane 206. The resistive element 208 couples to the resonating element 214 and the inductive element 210. The resonating element 214 couples to the resistive element 208 and the inductive element 210. The inductive element 210 couples to the resonating element 214, the resonating element 216, and the capacitive element 212. The resonating element 216 couples to the inductive element 210, the capacitive element 212, and the ground plane 206. In some examples, the antenna 202, the resistive element 208, the capacitive element 212, the resonating element 216, or a combination thereof, couple to the ground plane 206 via a solder joint. In other examples not explicitly shown, the antenna 202, the resonating element 214, the resonating element 216, or a combination thereof, couple to the ground plane 206 using a via.

In some examples, the resistive element 208 is a resistor. A first end of the resistor couples to a first resonating element (e.g., the resonating element 214) and a second end of the resistor couples to the ground plane 206. The inductive element 210 is an inductor. A first end of the inductor couples to the first resonating element, and a second end of the inductor couples to a second resonating element (e.g., the resonating element 216). The capacitive element 212 is a capacitor. A first end of the capacitor couples to the second resonating element, and a second end of the capacitor couples to the ground plane 206. The resistive element 208, the inductive element 210, and the capacitive element 212 may be referred to as an RLC circuit, as described below with respect to FIG. 4, for example.

As described above with respect to the noise canceling circuit 104 of FIG. 1, in various examples, the noise canceling circuit 204 includes a substrate disposed within a cutout of the ground plane 206. In some examples, the ground plane 206 is to couple to a ground foil of a system. The system is an electronic device, a display device, or a combination thereof, for example. In various examples, the cutout of the ground plane 206 corresponds to a cutout of the ground foil of the system. In some examples, the ground plane 206 is to couple to the ground foil of the system. For example, the antenna module 200 includes metal pads or traces such that in response to the antenna module 200 being disposed within the system, the metal pads or traces are to couple the ground plane 206 to the ground foil of the system. As described above with respect to the antenna module 100 of FIG. 1, in some examples, the antenna module 200 includes a connector for a coaxial cable. The connector enables the ground plane 206 to couple to a ground reference of the system. The coaxial cable enables the antenna module 200 to communicate with a controller of the system. The controller is a controller of a wireless transceiver module or a processor of the system, for example.

By including the resonating elements 214, 216, the resistive element 208, the inductive element 210, and the capacitive element 212, the noise canceling circuit 204 enables changing the energy phase and amplitude among the resonating elements 214, 216.

Figure 3:
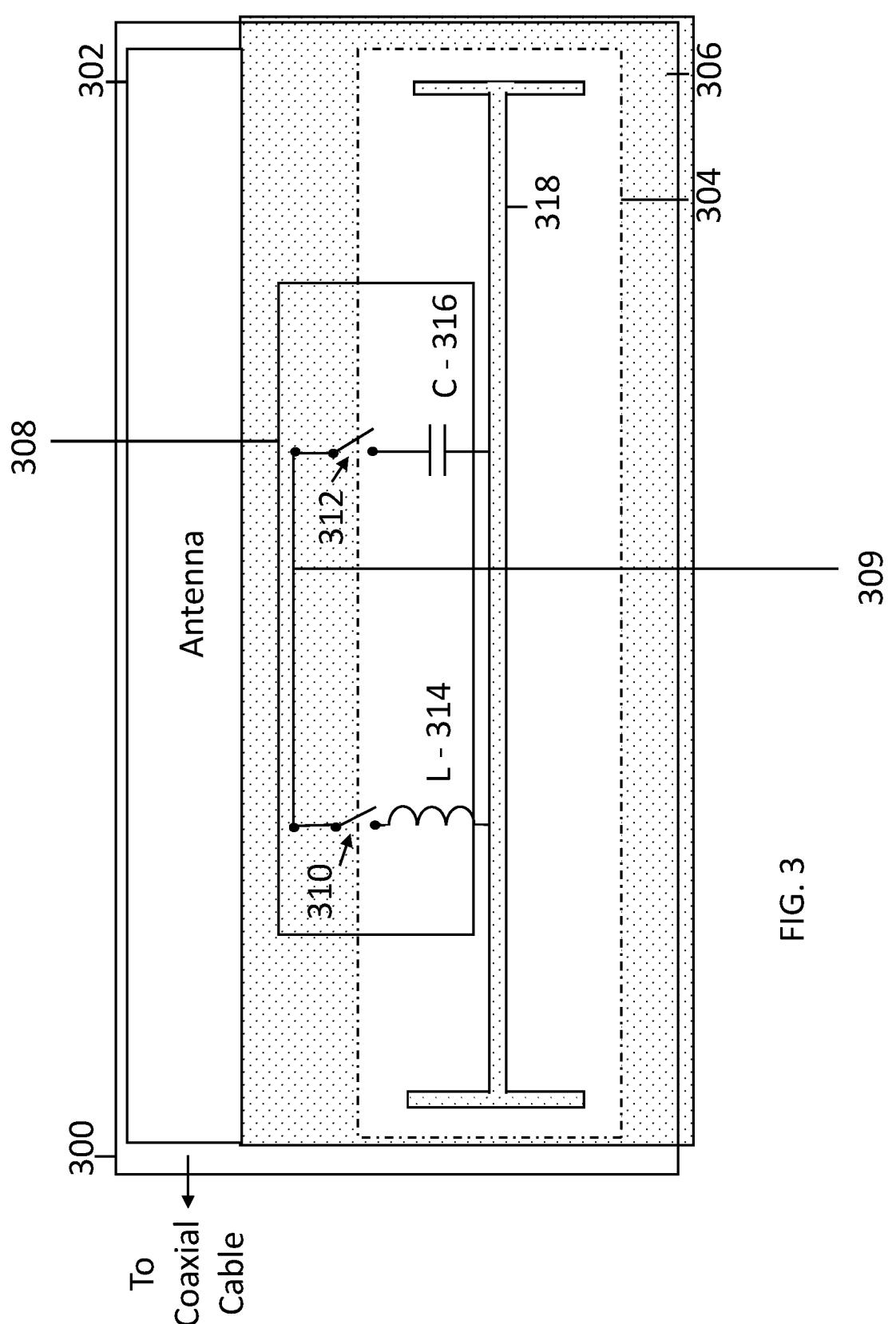
FIG. 3 is a block diagram of an antenna module having a noise canceling circuit, in accordance with various examples.

Referring now to FIG. 3, a block diagram of an antenna module 300 having a noise canceling circuit 304 is shown, in accordance with various examples. The antenna module 300 includes an antenna 302, the noise canceling circuit 304, and a ground plane 306. The antenna 302 is any suitable antenna for enabling wireless communications within a frequency band. The antenna 302 enables wireless communications within the 2.4 gigahertz (GHz) frequency band, the 5 GHz frequency band, the 6 GHz frequency band (e.g., WiFi), Global Positioning System (GPS) frequency bands, a BLUETOOTH frequency band, Wide Wireless Area Network (WWAN) frequency bands, or other suitable frequency band for wireless communications, for example. The noise canceling circuit 304 includes a tuner circuit 308, switches 310, 312, an inductive element 314, a capacitive element 316, and a resonating element 318, for example. In some examples, a controller (not shown) is coupled to the switches 310, 312 to control the switches 310, 312 to be open or closed, such as to enable various noise cancelling features of the tuner circuit 308. For example, in an implementation the switch 310 is useful for performing noise canceling in the 2.4 GHz frequency band and the switch 312 is useful for performing noise canceling in the 5 GHz, 6 GHz, or combination thereof frequency bands.

The antenna 302, and the switches 310, 312 couple to the ground plane 306. The tuner circuit 308 includes the switches 310, 312. A switch 310 couples to the tuner circuit 308 and the inductive element 314. A switch 312 couples to the capacitive element 316. The inductive element 314 couples to the resonating element 318. The capacitive element 316 couples to the resonating element 318. The resonating element 318 couples to the inductive element 314 and the capacitive element 316. In some examples, the antenna 302, the switch 310, the switch 312, or a combination thereof, couple to the ground plane 306 via a solder joint. In other examples not explicitly shown, the antenna 302, the resonating element 318, or a combination thereof, couple to the ground plane 306 using a via. The switches 310, 312 are coupled to a controller (not shown), such as a processor or radio module, via coupling 309 to facilitate determination by the controller of a switch status (e.g., open or closed) of the switches 310, 312.

In various examples, the inductive element 314 is an inductor. A first end of the inductor couples to the resonating element 318, and a second end of the inductor couples to a first end of a first switch (e.g., the switch 310). The capacitive element 316 is a capacitor. A first end of the capacitor couples to the resonating element 318, and a second end of the capacitor couples to a first end of a second switch (e.g., the switch 312).

As described above with respect to the noise canceling circuit 104 of FIG. 1, in various examples, the noise canceling circuit 304 includes a substrate disposed within a cutout of the ground plane 306. In some examples, the ground plane 306 is to couple to a ground foil of a system. The system is an electronic device, a display device, or a combination thereof, for example. In various examples, the cutout of the ground plane 306 corresponds to a cutout of the ground foil of the system. In some examples, the ground plane 306 is to couple to the ground foil of the system. For example, the antenna module 300 includes metal pads or traces such that in response to the antenna module 300 being disposed within the system, the metal pads or traces are to couple the ground plane 306 to the ground foil of the system. As described above with respect to the antenna module 100 of FIG. 1, in some examples, the antenna module 300 includes a connector for a coaxial cable. The connector enables the ground plane 306 to couple to a ground reference of the system. The coaxial cable enables the antenna module 300 to communicate with a controller of the system. The controller is a controller of a wireless transceiver module or a processor of the system, for example. In various examples, the tuner circuit 308 is to couple to the coaxial cable.

By locating the noise canceling circuit 104, 204, 304 within the ground plane 106, 206, 306 of the antenna module 100, 200, 300, respectively, the noise canceling circuit 104, 204, 304 reduces use of bulky noise suppression components in a system. Reduction of use of the noise suppression components increases availability of space for other components, reduces dimensions of the system, reduces a weight of the system, or the combination thereof. By utilizing the antenna module 100, 200, 300 having the noise canceling circuit 104, 204, 304, interference with operations of the antenna 102, 202, 302, respectively, is reduced.

Figure 4:
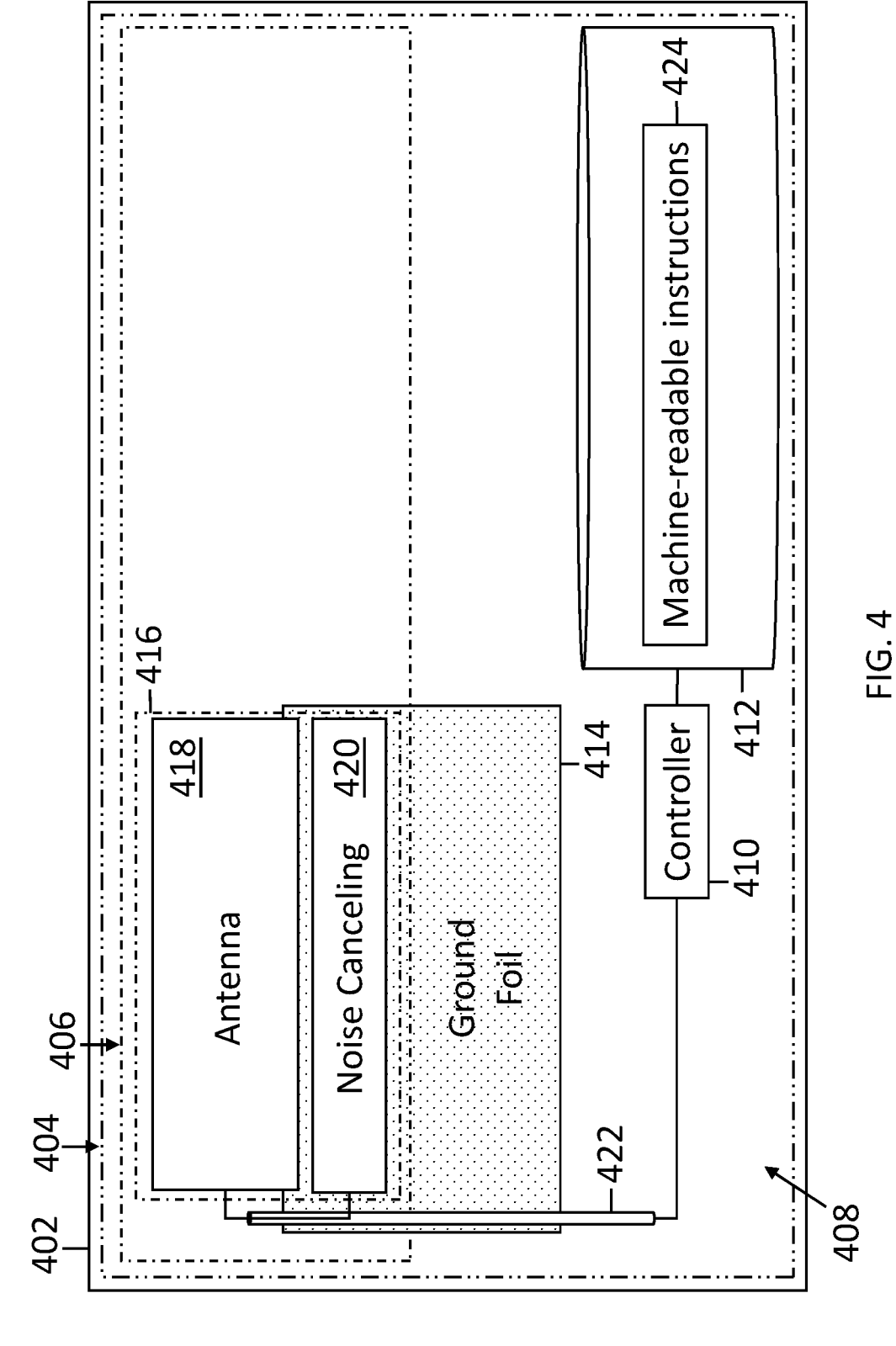
FIG. 4 is a block diagram of a cross-section view of a display device including an antenna module having a noise canceling circuit, in accordance with various examples.

Referring now to FIG. 4, a block diagram of a cross-section view of a display device 400 including an antenna module 416 having a noise canceling circuit 420 is shown, in accordance with various examples. The display device 400 is a monitor for an electronic device, a television, or other suitable device for displaying information and having an antenna that enables wireless communications. The antenna module 416 is the antenna module 100, 200, 300, for example. The noise canceling circuit 420 is the noise canceling circuit 104, 204, 304.

The display device 400 includes a chassis 402, a display panel 404, a controller 410, a storage device 412, a ground foil 414, the antenna module 416, and a coaxial cable 422. The display panel 404 is a liquid crystal display (LCD) panel, a light-emitting diode (LED) panel, a quantum dot (QD) panel, or any suitable panel for displaying images, for example. The controller 410 is a microcontroller, a micro-computer, a programmable integrated circuit, a program-mable gate array, or other suitable device for managing operations of the display device 400 or a component or multiple components of the display device 400. For example, the controller 410 is a controller of a wireless transceiver module, a timing controller, a central processing unit (CPU), or a graphics processing unit (GPU). The storage device 412 is a hard drive, a solid-state drive (SSD), flash memory, random access memory (RAM), or other suitable memory for storing data or machine-readable instructions of the display device 400. The ground foil 414 is a metal material.

The chassis 402 includes portions 406, 408. In some examples, the chassis 402 has a plastic portion and a metal portion. A portion 406 is the plastic portion, for example. In other examples, the portion 406 is another suitable material that enables propagation of electromagnetic (EM) waves. A portion 408 is the metal portion, for example. The chassis 402 includes an internal side and an external side. The antenna module 416 is disposed behind the display panel 404 on the plastic portion (e.g., the portion 406) of the internal side of the chassis 402. While the antenna module 416 is described above as a single module (e.g., the antenna module 100, 200, 300) including the noise canceling circuit 420, in other examples, the antenna 418 and the noise canceling circuit 420 are separate components. The antenna 418 is any suitable antenna for enabling wireless communications within a frequency band. The antenna 418 enables wireless communications within the 2.4 gigahertz (GHz) frequency band, the 5 GHz frequency band, the 6 GHz frequency band, the Global Positioning System (GPS) frequency bands, the BLUETOOTH frequency band, the Wide Wireless Area Network (WWAN) frequency bands, or other suitable frequency band for wireless communications, for example. The antenna 418 and the noise canceling circuit 420 are disposed behind the display panel 404 on the plastic portion of the internal side of the chassis 402. The noise canceling circuit 420 is disposed within a cutout of the ground foil 414. As described above with respect to the noise canceling circuit 104, 204, 304 of FIG. 1, 2, 3, respectively, the noise canceling circuit 420 includes a substrate disposed within a cutout of the ground foil 414, for example.

In various examples, the controller 410 couples to the storage device 412, and the coaxial cable 422. The storage device 412 couples to the controller 410. While in some examples, the storage device 412 is shown as a separate component, on other examples, the storage device is integrated within a chip including the controller 410. In some examples, the storage device 412 includes machine-readable instructions 424. The machine-readable instructions 424, when executed by the controller 410, cause the controller 410 to perform some or all of the actions attributable to the controller 410. The machine-readable instructions 424 cause the controller 410 to perform some or all of the operations described below with respect to FIG. 5, for example. The ground foil 414 couples to the metal portion (e.g., the portion 408) of the internal side of the chassis 402, the antenna 418, and the noise canceling circuit 420. The ground foil 414 may be coupled to the noise canceling circuit 420, the antenna 418, or a combination thereof, as described above with respect to FIG. 1, 2, or 3, for example.

In some examples, the noise canceling circuit 420 includes a resonating element (e.g., the resonating element 318) and a filter having a first end coupled to the resonating element and a second end coupled to the ground foil 414. For example, the filter is an RC circuit, an RLC circuit, an LC circuit, or other suitable circuit including passive elements. Different couplings of the elements of the RLC circuit generate different types of filters. The types of filter include a low-pass filter, a high-pass filter, a band-pass filter, or a band-stop filter, for example. The low-pass filter enables signals having frequencies that are less than a cutoff frequency to pass through and attenuates signals having frequencies that are equivalent to or greater than the cutoff frequency. The high-pass filter enables signals having frequencies that are greater than the cutoff frequency to pass through and attenuates signal having frequencies that are equivalent to or below the cutoff frequency to attenuate. The band-pass filter enables signals having frequencies within a frequency bandwidth to pass through and attenuates signals having frequencies outside the frequency bandwidth. The band-stop filter enables signals having frequencies outside the frequency bandwidth to pass through and attenuates signals within the frequency bandwidth. The couplings of the RLC circuit to the resonating element and the ground foil 414 are based on the type of filter. The type of filter is selected based on a specified operation. For example, the type of filter that may be used to amplify a signal.

For example, the resonating element is to resonate in response to detection of a signal having a frequency. In response to the frequency being below a cutoff frequency, the filter enables propagation of the signal. In response to the frequency being equivalent to or above the cutoff frequency, the filter disables propagation of (e.g., attenuates) the signal.

In another example, the resonating element is to resonate in response to detection of a signal having a frequency. In response to the frequency being below a first cutoff frequency and above a second cutoff frequency, the filter enables propagation of the signal. In response to the frequency being equivalent to or above the first cutoff frequency or equivalent to or below the second cutoff frequency, the filter disables propagation of the signal.

In some examples, the machine-readable instructions 424, cause the controller 410 to control switches (e.g., the switches 310, 312) in response to measurements of a detected signal of the antenna 418. The switches enable or disable different types of filters, for example. For example, the noise canceling circuit 420 includes a multiplexer (e.g., the tuner circuit 308). In response to a determination of a frequency of the detected signal, the controller 410 generates a control signal for the multiplexer. In response to the control signal, the multiplexer causes the switches to open or close. For example, in response to the detected signal having a frequency within a first frequency range, the controller 410 controls the switches to enable a low-pass filter. In response to the detected signal having a frequency within a second frequency range, the controller 410 controls the switches to enable a high-pass filter. In response to the detected signal having a frequency within a third frequency range, the controller 410 controls the switches to enable a band-pass filter. In response to the detected signal having a frequency within a fourth frequency range, the controller 410 controls the switches to enable a band-stop filter.

Figure 5:
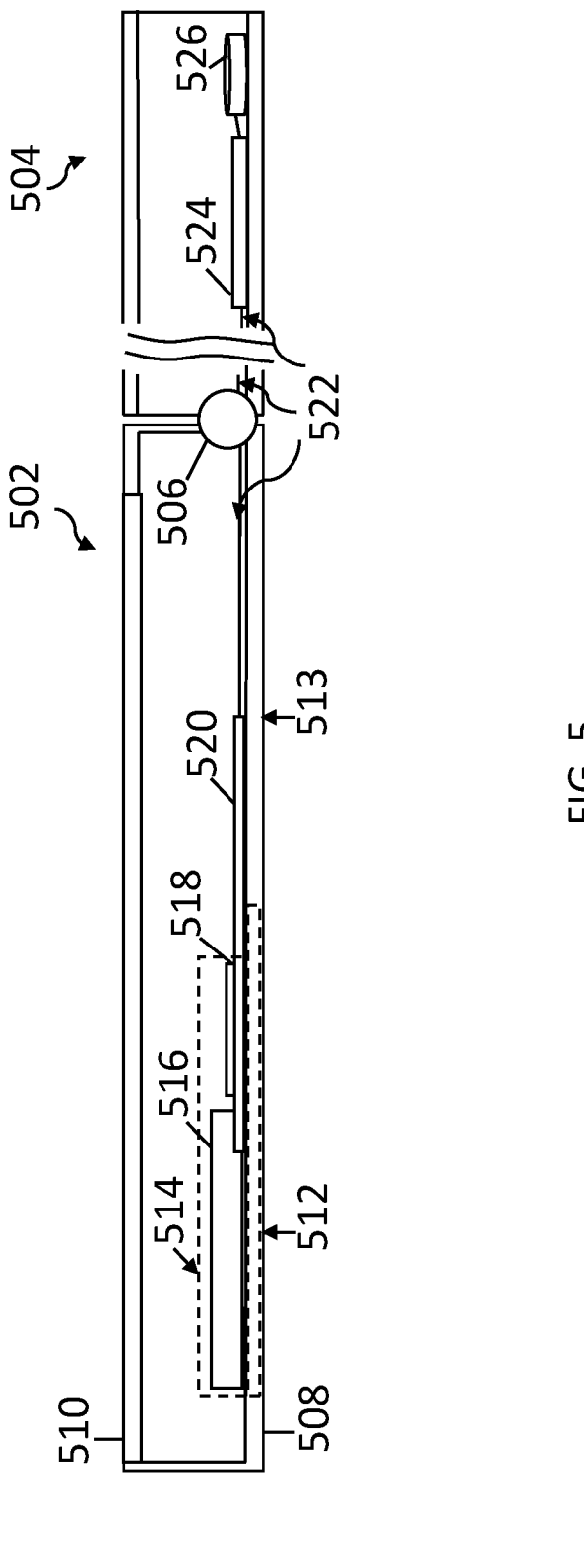
FIG. 5 is a block diagram of a cross-section view of an electronic device including an antenna module having a noise canceling circuit, in accordance with various examples.

Referring now to FIG. 5, a block diagram of a cross-section view of an electronic device 500 including an antenna module 514 having a noise canceling circuit 518 is shown, in accordance with various examples. The electronic device 500 is a notebook, laptop, desktop, tablet, smart-phone, or other suitable computing device that utilizes wireless communications, for example. The electronic device 500 includes a lid section 502, a base section 504, and a hinge section 506. The lid section 502 includes a chassis 508, a display panel 510, an antenna module 514, and a ground foil 520. The chassis 508 includes portions 512, 513. The display panel 510 is an LCD panel, an LED panel, a QD panel, or any suitable panel for displaying images, for example. The antenna module 514 includes an antenna 516 and a noise canceling circuit 518. The ground foil 520 is a metal material.

The base section 504 includes a controller 524 and a storage device 526. The controller 524 is a microcontroller, a microcomputer, a programmable integrated circuit, a pro-grammable gate array, or other suitable device for managing operations of the electronic device 500 or a component or multiple components of the electronic device 500. For example, the controller 524 is a controller of a wireless transceiver module, a timing controller, a CPU, or a GPU. The storage device 526 is a hard drive, an SSD, flash memory, RAM, or other suitable memory for storing data or machine-readable instructions of the electronic device 500.

In some examples, the chassis 508 has a plastic portion and a metal portion. A portion 512 is the plastic portion, as indicated by the dotted lines, for example. A portion 513 is the metal portion, for example. The chassis 508 includes an internal side and an external side. The antenna module 514 is disposed behind the display panel 510 on the plastic portion of the internal side of the chassis 508. In various examples, the antenna module 514 is disposed within the electronic device 500 to facilitate radiation of electromag-netic (EM) waves, reduce a specific absorption rate (SAR), or a combination thereof. The SAR is a rate at which energy is absorbed by a human body per unit mass. A governmental standard or regulation specifies the maximum SAR for the electronic device 500, for example.

While the antenna module 514 is described above as a single module (e.g., the antenna module 100, 200, 300), as indicated by the dotted lines, including the noise canceling circuit 518, in other examples, the antenna 516 and the noise canceling circuit 518 are separate components. The antenna 516 enables wireless communications within the 2.4 GHz frequency band, the 5 GHz frequency band, the 6 GHz frequency band, the GPS frequency bands, the BLU-ETOOTH frequency band, the WWAN frequency bands, or other suitable frequency band for wireless communications, for example. The antenna 516 and the noise canceling circuit 518 are disposed behind the display panel 510 on the plastic portion of the internal side of the chassis 508. The noise canceling circuit 518 is disposed within a cutout of the ground foil 520. As described above with respect to the noise canceling circuit 104, 204, 304 of FIG. 1, 2, 3, respectively, the noise canceling circuit 518 includes a substrate disposed within a cutout of the ground foil 520, for example.

In various examples, the lid section 502 couples to the hinge section 506. The base section 504 couples to the hinge section 506. The hinge section 506 couples to the lid section 502 and the base section 504. In some examples, the controller 524 couples to the storage device 526 and the ground foil 520 via a metal trace 522. The metal trace 522 is disposed within the lid section 502, the base section 504, and the hinge section 506, for example.

The ground foil 520 couples to the metal portion (e.g., the portion 513) of the internal side of the chassis 508, the antenna 516, and the noise canceling circuit 518. The ground foil 520 couples to the noise canceling circuit 518, the antenna 516, or a combination thereof, as described above with respect to FIG. 1, 2, or 3, for example. In some examples, the storage device 526 includes machine-readable instructions. The machine-readable instructions are the machine-readable instructions 424, for example. The machine-readable instructions, when executed by the con-troller 524, cause the controller 524 to perform some or all of the actions attributable to the controller 524.

In various examples, the noise canceling circuit 518 includes a resonating element (e.g., the resonating element 110, 112, 214, 216, 318) and a filter (e.g., the resistive element 208, the inductive element 210, 314, the capacitive element 212, 316) having a first terminal and a second terminal. The first terminal couples to the resonating ele-ment. The noise canceling circuit 518 includes a tuner (e.g., the tuner circuit 308) coupled to a first end of a switch (e.g., the switch 310, 312) and to the ground foil 520. The tuner detects a frequency of the resonating element, and, in response to the frequency, causes the second terminal to couple to a second end of the switch.

In some examples, the filter is a first filter and the switch is a first switch. The noise canceling circuit 518 includes a second filter (e.g., the resistive element 208, the inductive element 210, 314, the capacitive element 212, 316) having a third terminal and a fourth terminal. The third terminal couples to the resonating element. The tuner couples to a first end of a second switch (e.g., the switch 310, 312) and to the ground foil 520. In response to the frequency, the tuner causes the fourth terminal to decouple from a second end of the second switch.

In various examples, the tuner detects a second frequency of the resonating element. In response to the second fre-quency, the tuner causes the fourth terminal to couple to the second end of the second switch and the second terminal to decouple from the second end of the first switch. In other examples, the tuner detects a third frequency of the reso-nating element. In response to the third frequency, the tuner causes the fourth terminal to couple to the second end of the second switch and the second terminal to couple to the second end of the first switch. In some examples, the tuner detects a fourth frequency of the resonating element. In response to the fourth frequency, the tuner causes the fourth terminal to decouple from the second end of the second switch and the second terminal to decouple from the second end of the first switch. In some examples, as described above with respect to FIG. 4, the storage device 526 includes machine-readable instructions, which, when executed by the controller 524, causes the controller 524 to transmit control signals to cause the tuner to control the switches.

Figure 6:
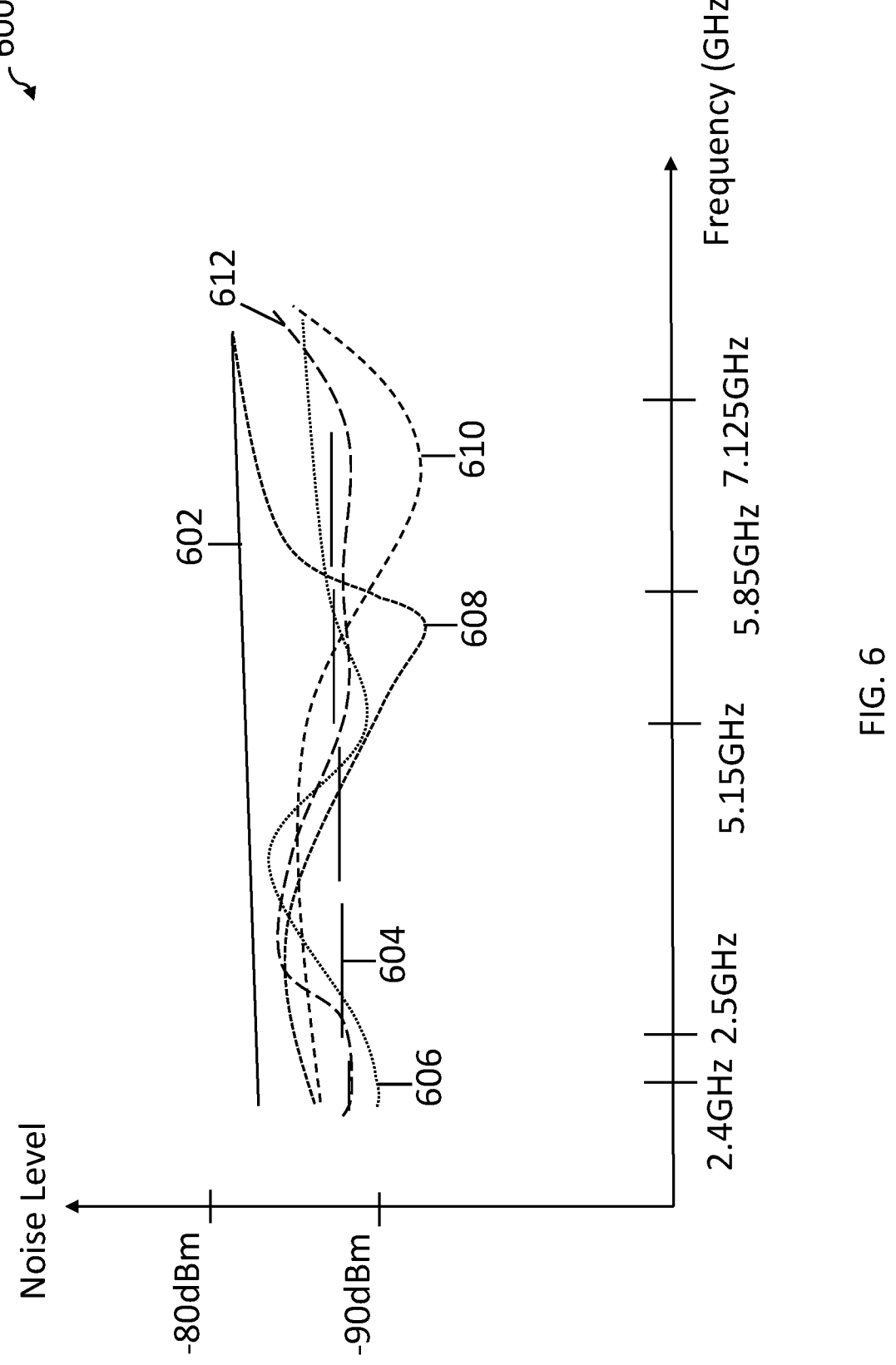
FIG. 6 is a timing diagram of a system including a noise canceling circuit, in accordance with various examples.

Referring now to FIG. 6, a timing diagram 600 of a system (e.g., the display device 400, the electronic device 500) including a noise canceling circuit (e.g., the noise canceling circuit 104, 204, 304, 420, 518) is shown, in accordance with various examples. The signal 602 indicates a performance of the system when the noise canceling circuit is not present in the system. The signal 604 indicates a noise specification (e.g., noise limit) of −88 dBm. The signal 606 is a signal that a first configuration of the noise canceling circuit enables. The first configuration is for a WI-FI 2.4 GHz performance, for example. The signal 608 is a signal that a second configuration of the noise canceling circuit enables. The second configuration is for a WI-FI 5 GHz performance, for example. The signal 610 is a signal that a third configuration of the noise canceling circuit enables. The third configuration is for a WI-FI 6 E performance, for example. The signal 612 is a signal that a fourth configuration of the noise canceling circuit enables. The fourth configuration is for carrier aggregation performance. The carrier aggregation aggregates the WI-FI 2.4 GHz, WI-FI 5 GHz, WI-FI 6 E, or a combination thereof, for example.

The signals 606, 608, 610, 612 having values below the signal 602 shows that the noise canceling circuit reduces interference of signals received by the system. In various examples, signals that have values below the signal 604 indicate that the signals pass the noise specification. The signal 606 having values below the signal 604 for the frequencies between 2.4 GHz and 2.5 GHz shows that the noise canceling circuit having the first configuration reduces interference of signal 606 having frequencies within the 2.4 GHz frequency band received by the system. The signal 608 having values below the signal 604 for the frequencies between approximately 5 GHz and 6 GHz shows that the noise canceling circuit having the second configuration reduces interference of signal having frequencies within the 5 GHz frequency band received by the system. The signal 610 having values below the signal 604 for the frequencies between 5.5 GHz and 7.25 GHz shows that the noise canceling circuit having the third configuration reduces interference of signal having frequencies of the 6 E frequency band received by the system. The signal 612 having values below the signal 604 for the frequencies between 5.2 GHz and 7.2 GHz shows that the noise canceling circuit having the fourth configuration reduces interference of signal having frequencies of a carrier aggregation frequency band received by the system.

The above description is meant to be illustrative of the principles and various examples of the present description. Numerous variations and modifications become apparent to those skilled in the art once the above description is fully appreciated. It is intended that the following claims be interpreted to embrace all such variations and modifications.

In the figures, certain features and components disclosed herein are shown in exaggerated scale or in somewhat schematic form, and some details of certain elements are not shown in the interest of clarity and conciseness. In some of the figures, in order to improve clarity and conciseness, a component or an aspect of a component are omitted.

In the above description and in the claims, the term "comprising" is used in an open-ended fashion, and thus should be interpreted to mean "including, but not limited to . . . " Also, the term "couple" or "couples" is intended to be broad enough to encompass both direct and indirect connections. Thus, if a first device couples to a second device, that connection may be through a direct connection or through an indirect connection via other devices, components, and connections. Additionally, the word "or" is used in an inclusive manner. For example, "A or B" means any of the following: "A" alone, "B" alone, or both "A" and "B."

What is claimed is:

1. An antenna module, comprising:
a ground plane, the ground plane to couple to a ground foil of an electronic device;
an antenna coupled to the ground plane; and
a noise canceling circuit disposed within a cutout of the ground plane, wherein the noise canceling circuit comprises a resonating element.

2. The antenna module of claim 1, wherein the resonating element comprises:
a first resonating element to resonate in response to a first frequency range; and
a second resonating element coupled to the ground plane, the second resonating element to resonate in response to a second frequency range.

3. The antenna module of claim 2, wherein the noise canceling circuit comprises:
a resistor, a first end of the resistor coupled to the first resonating element and a second end of the resistor coupled to the ground plane;
an inductor, a first end of the inductor coupled to the first resonating element and a second end of the inductor coupled to the second resonating element; and
a capacitor, a first end of the capacitor coupled to the second resonating element and a second end of the capacitor coupled to the ground plane.

4. The antenna module of claim 1, wherein the noise canceling circuit comprises:
an inductor, a first end of the inductor coupled to the resonating element and a second end of the inductor coupled to a first end of a first switch;
a capacitor, a first end of the capacitor coupled to the resonating element and a second end of the capacitor coupled to a first end of a second switch; and
a tuner circuit including the first switch and the second switch.

5. The antenna module of claim 4, wherein the tuner circuit is to couple to a coaxial cable of the electronic device.

6. The antenna module of claim 1, wherein the noise canceling circuit is disposed on a non-conducting substrate within the cutout of the ground plane.

7. The antenna module of claim 1, wherein the resonating element has a length that is a half wavelength or a quarter wavelength of a frequency range of the antenna.

8. A display device, comprising:
a chassis having a plastic portion and a metal portion, the chassis including an internal side and an external side;
a ground foil coupled to the metal portion of the internal side of the chassis;
an antenna coupled to the ground foil, the antenna disposed on the plastic portion of the internal side of the chassis; and
a noise canceling circuit coupled to the antenna, the noise canceling circuit disposed within a cutout of the ground foil, wherein the noise canceling circuit comprises a resonating element.

9. The display device of claim 8, wherein an antenna module comprises the antenna and the noise canceling circuit.

10. The display device of claim 8, wherein the noise canceling circuit comprises:
a filter having a first end coupled to the resonating element and a second end coupled to the ground foil.

11. The display device of claim 10, wherein the resonating element is to resonate in response to detection of a signal having a frequency, wherein in response to the frequency being below a cutoff frequency, the filter enables propagation of the signal, and wherein in response to the frequency being equivalent to or above the cutoff frequency, the filter disables propagation of the signal.

12. The display device of claim 10, wherein the resonating element is to resonate in response to detection of a signal having a frequency, wherein in response to the frequency being below a first cutoff frequency and above a second cutoff frequency, the filter enables propagation of the signal, and wherein in response to the frequency being equivalent to or above the first cutoff frequency or equivalent to or below the second cutoff frequency, the filter disables propagation of the signal.

13. The display device of claim 10, wherein the filter is a low-pass filter, a high-pass filter, a band-pass filter, or a band-stop filter.

14. The display device of claim 8, wherein the antenna and the noise canceling circuit are disposed behind a display panel of the display device.

15. The display device of claim 8, further comprising a controller coupled to the noise canceling circuit, wherein the controller controls switches of the noise canceling circuit in response to a detected frequency.

16. An electronic device, comprising:
a ground foil coupled to an internal, metal portion of a chassis of the electronic device;
an antenna having a ground coupled to the ground foil, the antenna disposed on an internal, plastic portion of the chassis; and
a noise canceling circuit comprising:
a resonating element;
a filter having a first terminal and a second terminal, the first terminal coupled to the resonating element; and
a switch coupled to the ground foil;
wherein the electronic device is to:
detect a frequency of the resonating element; and in response to the frequency, cause the second terminal to couple to a second end of the switch.

17. The electronic device of claim 16, wherein the filter is a first filter and the switch is a first switch, and the noise canceling circuit comprising:
a second filter having a third terminal and a fourth terminal, the third terminal coupled to the resonating element,
a second switch coupled to the ground foil and the first end of the first switch, and
wherein the second switch is to, in response to the frequency, cause the fourth terminal to decouple from a second end of the second switch.

18. The electronic device of claim 17, wherein the electronic device is to:
detect a second frequency of the resonating element; and
in response to the second frequency, cause the fourth terminal to couple to the second end of the second switch and the second terminal to decouple from the second end of the first switch.

19. The electronic device of claim 17, wherein the electronic device is to:
detect a third frequency of the resonating element; and
in response to the third frequency, cause the fourth terminal to couple to the second end of the second switch and the second terminal to couple to the second end of the first switch.

20. The electronic device of claim 17, wherein the electronic device is to:
detect a fourth frequency of the resonating element; and
in response to the fourth frequency, cause the fourth terminal to decouple from the second end of the second switch and the second terminal to decouple from the second end of the first switch.

* * * * *